US009503180B2

(12) United States Patent
Jin et al.

(10) Patent No.: US 9,503,180 B2
(45) Date of Patent: Nov. 22, 2016

(54) INTERFERENCE DETECTION AND AVOIDANCE IN A TELECOMMUNICATION NETWORK

(71) Applicant: Cisco Technology, Inc., San Jose, CA (US)

(72) Inventors: Hang Jin, Plano, TX (US); Tong Liu, Acton, MA (US); Pawel Sowinski, Sudbury, MA (US); De Fu Li, Wayland, MA (US); John Skrobko, Berkeley Lake, GA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 14/476,969

(22) Filed: Sep. 4, 2014

(65) Prior Publication Data

US 2016/0072578 A1 Mar. 10, 2016

(51) Int. Cl.
*H04J 14/08* (2006.01)
*H04B 10/079* (2013.01)
*H04J 3/16* (2006.01)
*H04L 12/26* (2006.01)
*H04L 12/28* (2006.01)

(52) U.S. Cl.
CPC ...... *H04B 10/0795* (2013.01); *H04B 10/0793* (2013.01); *H04J 3/1694* (2013.01); *H04L 12/2801* (2013.01); *H04L 43/0882* (2013.01)

(58) Field of Classification Search
CPC .................. H04B 10/0795; H04B 10/0793; H04L 43/0882; H04L 12/2801; H04J 3/1694; H04J 14/086
USPC ...................................... 398/98–99
See application file for complete search history.

(56) References Cited

U.S. PATENT DOCUMENTS

| | | | |
|---|---|---|---|
| 2005/0232294 A1 | 10/2005 | Quigley et al. | |
| 2010/0083330 A1 | 4/2010 | Bernstein et al. | |
| 2012/0275792 A1* | 11/2012 | Nandiraju | H04L 12/2801 398/66 |
| 2012/0308237 A1 | 12/2012 | Mutalik et al. | |
| 2013/0188954 A1* | 7/2013 | Lanza | H04B 10/2575 398/68 |
| 2014/0348511 A1* | 11/2014 | Mutalik | H04B 10/25751 398/136 |
| 2015/0280816 A1* | 10/2015 | Al-Banna | H04B 10/2575 398/26 |

OTHER PUBLICATIONS

International Search Report and Written Opinion in corresponding International Application No. PCT/US2015/048506, mailed Nov. 23, 2015, 9 pages.

* cited by examiner

*Primary Examiner* — Leslie Pascal
(74) *Attorney, Agent, or Firm* — Edell, Shapiro & Finnan, LLC

(57) ABSTRACT

Presented herein are techniques for detection and avoidance of interference in a telecommunications network. In one example, a cable modem termination system (CMTS) is configured to receive upstream traffic from a plurality of cable modems. The CMTS detects collision characteristics resulting from substantially simultaneous transmissions from different combinations of the cable modems. Based on the detected collision characteristics, the CMTS designates/identifies collision groups for each of a plurality of the cable modems. After designation of the collision groups, the CMTS schedules upstream transmissions by the plurality of cable modems such that cable modems within the same collision group do not transmit within a same time frame and such that two or more cable modems that are not within the same collision group may transmit within a same time frame.

20 Claims, 6 Drawing Sheets

| HEADER | |
|---|---|
| SID | COLLISION STATUS |
| SID1 | 1 |
| SID2 | 0 |
| SID3 | 1 |
| SID4 | 0 |
| SID5 | 1 |
| . | . |
| . | . |
| . | . |
|  |  |
|  |  |
|  |  |
|  |  |

FIG.6

INTERFERENCE DETECTION AND AVOIDANCE IN A TELECOMMUNICATION NETWORK

TECHNICAL FIELD

The present disclosure relates to interference detection and avoidance in telecommunications networks.

BACKGROUND

A Hybrid Fiber Coaxial (HFC) network is a telecommunications network that uses optical fiber cables and coaxial cables in different portions of the network to carry content (e.g., video, data, voice, etc.). For example, a system operator may install (or have installed) fiber optic cable from the distribution center (head-end facility) to intermediate nodes located close to a large number of users. From these intermediate nodes, coaxial cable may extend to individual businesses, residences, or other locations. A HFC network may be advantageous in that features of fiber optic cable (e.g., high bandwidth, low noise/interference susceptibility, etc.) can be utilized to reach points close to the users without having to install fiber optic cables to individual locations.

A Radio Frequency over Glass (RFoG) network is a telecommunications network that brings fiber to the home using one or more optical splitters from a shared fiber. There are cases where HFC and RFoG networks are combined.

The Data Over Cable Service Interface Specification (DOCSIS) is a telecommunications standard that has been widely used by network operators to provide high-speed data services to customers. For example, DOCSIS is employed by many cable television operators to provide Internet access over their existing HFC infrastructure.

BRIEF DESCRIPTION OF THE DRAWINGS

FIG. 6 is a schematic diagram illustrating a collision report in accordance with an example embodiment.

DESCRIPTION OF EXAMPLE EMBODIMENTS

Overview

Presented herein are techniques for detection and avoidance of interference in a telecommunications network. In one example, a cable modem termination system (CMTS) is configured to receive upstream traffic from a plurality of cable modems. The CMTS detects collision characteristics resulting from substantially simultaneous transmissions from different combinations of the cable modems. Based on the detected collision characteristics, the CMTS designates collision groups for each of a plurality of the cable modems. After designation of the collision groups, the CMTS schedules upstream transmissions by the plurality of cable modems such that cable modems within the same collision group do not transmit within a same time frame and such that two or more cable modems that are not within the same collision group may transmit within a same time frame.

Example Embodiments

DOCSIS is a communication protocol that is used for data transmissions (e.g., audio, video, Internet traffic, etc.) between a hub or headend facility (HEF) and, for example, a cable modem (CM) at a customer premise. For cable modem operations, a cable modem termination system (CMTS) is typically deployed in the HEF or hub and is configured to manage and support programming and Internet services for a plurality of cable modems.

DOCSIS version 3.1, in particular, expands upon existing DOCSIS protocol standards and deployed systems by way of orthogonal frequency-division multiplexing (OFDM) technology. In accordance with OFDM, a given frequency spectrum/space is divided into a plurality of orthogonal subcarriers that each comprises a small portion of the available spectrum. Each subcarrier is modulated orthogonally with respect to other subcarriers such that tens, hundreds or thousands of subcarriers may be used over a physical radio frequency (RF) channel. A subcarrier may comprise, for example, 25 or 50 kilohertz (KHz) of RF bandwidth. In one specific example, a six (6) megahertz (MHz) physical channel may be divided into 25 KHz wide subcarriers, thereby yielding 240 potential subcarriers (6 MHz/25 KHz=240 available subcarriers).

In an example telecommunications network, network data, video, audio, etc. may be transmitted on a single frequency channel or multiple (bonded) frequency channels (e.g., 6-8 MHz wide quadrature amplitude modulation (QAM) channels for downstream transmission). Upstream transmissions may use the same or a different transmission scheme.

Figure 1:
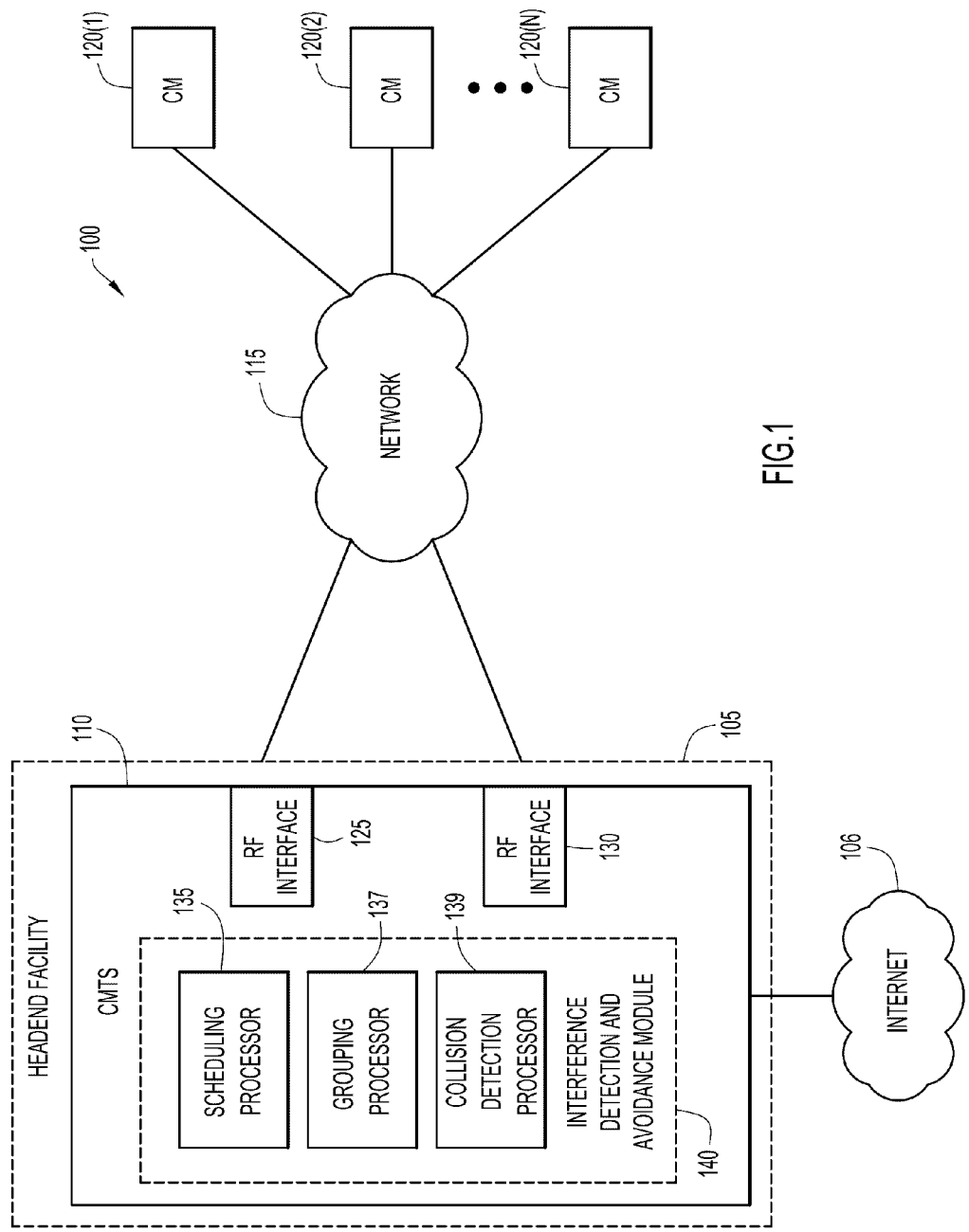
FIG. 1 is a block diagram of a telecommunications network configured to implement interference detection and avoidance techniques in accordance with an example embodiment.

FIG. 1 illustrates an example telecommunications network 100 (e.g., cable network) that utilizes Single-Carrier QAM (SC-QAM) and/or OFDM channels for data transmission. Telecommunications network 100 includes a CMTS 110 that forms part of a headend facility 105, a network 115 composed of RFoG or a combination of RFoG and HFC equipment (i.e., an RFOG or RFOG/HFC network), and a plurality a cable modems 120(1)-120(N). The cable modems 120(1)-120(N) may, for example, reside in one or more customer premises. The CMTS 110 includes one or more downstream radio frequency (RF) interfaces 125, one or more upstream RF interfaces 130, a scheduling processor (scheduler) 135, a grouping processor 137, and a collision detection processor 139. As described further below, the scheduler 135, the grouping processor 137, and the collision detection processor 139 may be the same and/or different processing entities and may be formed by hardware, software and/or a combination of hardware and software. The scheduler 135, the grouping processor 137, and the collision detection processor 139 collectively form an interference detection and avoidance module 140 that performs the interference detection and avoidance techniques described herein. It is to be appreciated that CMTS 110 may include other components that, for ease of illustration, have been omitted from FIG. 1.

The cable modems 120(1)-120(N) act as a bridge between the network 115 and home networks (not shown) for providing data services (e.g., Internet, telephony, television services, etc.) to/from the customer premises. For ease of illustration, cable modems 120(1)-120(N) of FIG. 1 are described as DOCSIS/EuroDOCSIS compliant (version 3.0 or greater) cable modems which make use of SC-QAM and/or OFDM technology. It is to be appreciated that the interference detection and avoidance techniques described herein are not limited to use in DOCSIS 3.1 or other DOCSIS systems, but rather may also be used with other protocols or communication techniques (e.g., asynchronous time division multiple access (ATDMA)).

The CMTS 110 may be, for example, an integrated, distributed, or modular CMTS that connects the network 115 to a data network, such as the Internet 106. The cable modems 120(1)-120(N) may provide a packet interface (e.g., Ethernet compliant) to various consumer premises equipment (CPE) (not shown). In certain arrangements, one or more of the cable modems 120(1)-120(N) may be connected to a hub or router (also not shown), for example to implement a home network, wireless access, etc. A cable modem (or a second cable modem) may be implemented in other equipment, for example a "set-top-box" (STB) which provides an interface to a television.

Due to the fact that the upstream spectrum is shared by the cable modems 120(1)-120(N), DOCSIS specifies that the cable modems obtain upstream bandwidth according to a request/grant scheme. When a cable modem receives a packet to be sent upstream on the network 115, the cable modem sends a bandwidth allocation request to the CMTS 110. The CMTS scheduler 135 grants these requests using bandwidth allocation map ("MAP") messages. MAP messages inform the cable modems about specific allocations of upstream spectrum in the time dimension, using time slots/frames or "minislots." The requesting cable modem then waits for its scheduled time before it can begin transmission. The DOCSIS specifications also provide other scheduling modes in which the CMTS 110 grants bandwidth to a cable modem without an explicit request from the cable modem. One example is the Unsolicited Grant Service (UGS) mode. UGS is an Upstream Flow Scheduling Service Type that is used for mapping constant bit rate (CBR) traffic onto service flows. Since the upstream is scheduled bandwidth, a CBR service can be established by the CMTS scheduling a steady stream of grants. These are referred to as being "unsolicited" because the bandwidth is predetermined, and no ongoing requests are made. The classic example of a CBR application is Voice over Internet Protocol (VoIP) packets.

Cable modems 120(1)-120(N) and CMTS 110 communicate over frequency channels of network 115. In addition, individual cable modems may be assigned to transmit on a specific frequency segment (e.g., a specific frequency segment that comprises a group of OFDM subcarriers in the case of DOCSIS 3.1, or a specific SC-QAM channel within the bonded SC-QAM channels). As such, a DOCSIS enabled cable modem may have multiple transceivers simultaneously operable at different frequencies.

Recently, especially in newer communities, service providers and/or developers have implemented fiber to the home (FTTH), in other words, running "fiber" or "glass" (optical fiber cable) all the way from the headend facility or distribution hub to the home. FTTH is desirable because it can carry high-speed broadband services integrating voice, data and video. Accordingly, separate traditional telephone lines (copper) and coaxial cable (coax) to the home for Internet access and television programming may be eliminated. RF over Glass ("RFoG") is advantageous because the analog RF signals transmitted over fiber (in the form of photons) incur little loss, even over run lengths of many miles. In contrast, losses over coax can be significant, requiring the use of repeaters or amplifier equipment every 1000 to 2000 feet. Fiber is also essentially immune to electromagnetic (EM) interference and unauthorized eavesdropping.

There are business cases in which DOCSIS 3.1 should support an RFoG deployment. As RFoG uses one or more optical splitters/combiner from a shared fiber, optical beat interference (OBI) may occur if multiple cable modems (optical transmitters) transmit at the same time. DOCSIS 3.1 over HFC does not cause interference due to collisions, but the incorporation of RFoG into HFC adds the possibility of OBI and therefore the possibility of collisions. Thus, RFoG deployment is limited to one cable modem (one optical transmitter) transmitting at a time to avoid OBI. As such, the efficiency of a DOCSIS 3.1 upstream in an RFoG deployment is low. For example, with one cable modem transmitting at a time, with a typical grant size of 2 kB, the efficiency is approximately 34% with 48 MHz, and 17% with 96 MHz upstream spectrum bandwidth (with 50 kHz carrier spacing and a minimum of six (6) symbol frame length, where 6 symbols has a length of 150 us and 300 us for 50 Hz and 25 kHz subcarrier spacing, respectively). The efficiency may be lower when considering the transmission of smaller packets, such as voice packets. To improve DOCSIS 3.1 upstream spectrum efficiency with RFoG deployment, multiple cable modems should transmit substantially simultaneously (e.g., during the same time slot, but on different subcarriers) to better utilize upstream capacity. However as noted above, multiple transmissions at the same time on the same frequency channel even on different subcarriers may cause OBI, resulting in, among other issues, poor Quality of service (QoS).

The interference detection and avoidance techniques presented herein enable multiple cable modems to generate substantially simultaneous transmissions (i.e., transmit within the same time slot on different frequency segments (e.g., subcarriers) in the same frequency channel), to obtain high spectrum efficiency with DOCSIS 3.1 in RFoG deployment while reducing or substantially eliminating OBI. As used herein, "simultaneous transmission" refers to multiple transmissions at the same time on different subcarriers or different channels (i.e., the transmissions overlap in time, but not in frequency).

In accordance with the interference detection and avoidance techniques presented herein, the substantially simultaneous transmissions from multiple cable modems occupy different subcarriers on the same frequency channel, but overlap with one another in time. As described further below, the detection and avoidance techniques enable a CMTS or other scheduling device to identify groups of two or more cable modems, referred to herein as "collision groups," that cause OBI during simultaneous transmissions. The detection and avoidance techniques enable the CMTS or other scheduling device to use the identified collision groups to schedule the simultaneous upstream transmissions on a frequency channel in a manner that reduces or substantially eliminates the occurrence of OBI.

Figure 2:
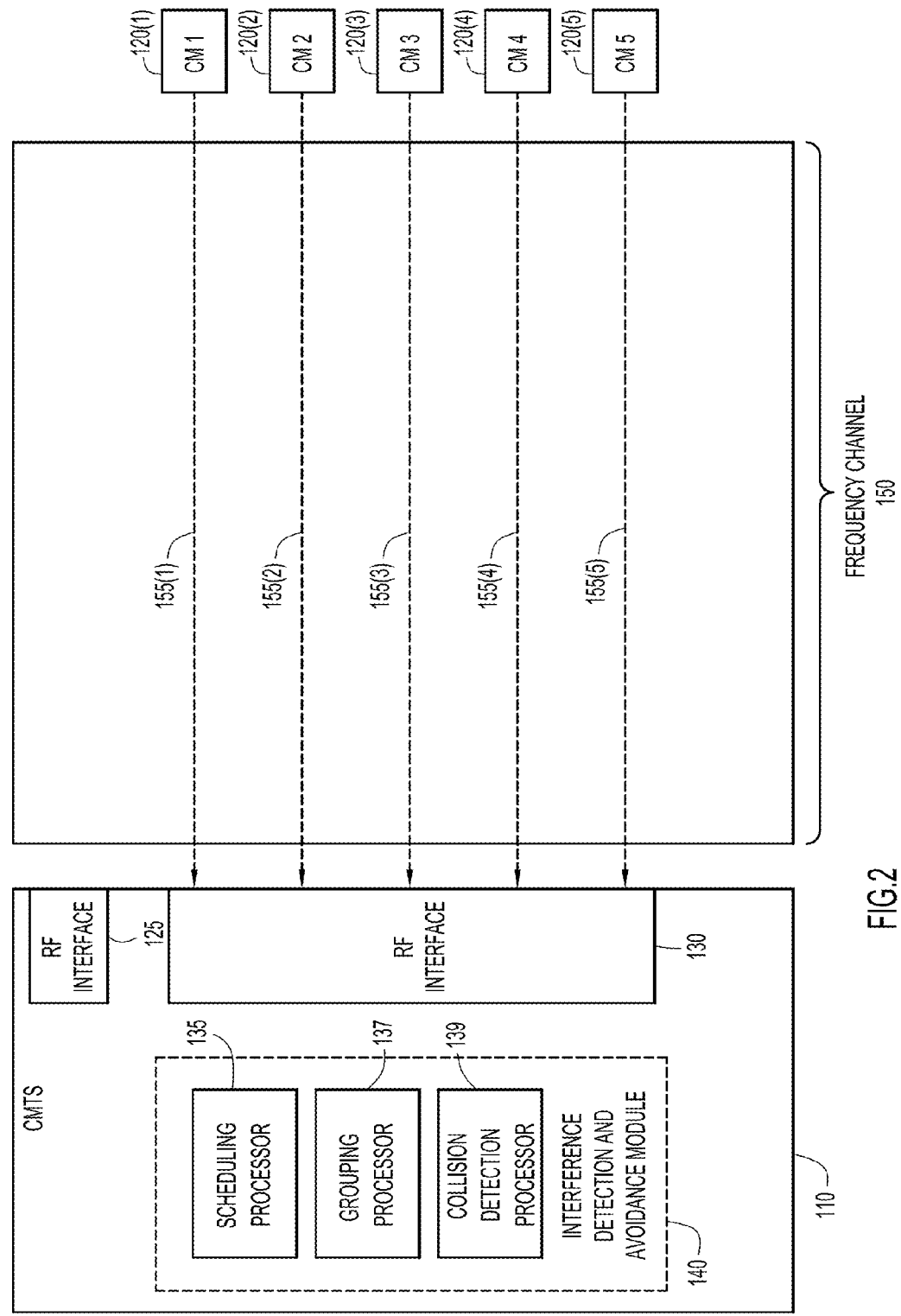
FIG. 2 is a schematic diagram illustrating a shared frequency channel of a telecommunications network in accordance with an example embodiment.

FIG. 2 is a schematic diagram illustrating five (5) cable modems 120(1)-120(5) that may share a frequency channel 150 for upstream transmission to CMTS 110 in accordance with the interference detection and avoidance technique presented herein. In general, the cable modems 120(1)-120(5) may transmit upstream frames comprised of symbols. The frames have variable lengths and, in certain examples, the minimum frame length is six (6) symbols. The upstream frames that may be transmitted from the cable modems 120(1)-120(5) to CMTS 110 on frequency channel 150 are represented in FIG. 2 by arrows 155(1)-155(5), respectively.

It is to be appreciated the illustration of five cable modems 120(1)-120(5) that may transmit on frequency channel 150 is merely one example and that different numbers of cable modems may be able to transmit on the same frequency channel.

In general, the detection and avoidance techniques include two components, namely detection of OBI caused by simultaneous cable modem transmissions and subsequent avoidance of the detected OBI. Referring first to OBI detection and the example of FIG. 2, substantially simultaneous upstream transmissions by different combinations of the cable modems 120(1)-120(5) are sequentially scheduled on the frequency channel 150. For example, cable modems 120(1) and 120(2) may be initially enabled to transmit on the frequency channel 150. If OBI occurs as a result of the simultaneous transmissions of cable modems 120(1) and 120(2), collision behavior/characteristics can be detected at the CMTS 110 (e.g., the collision detection processor 139). The scheduler limits the total number of modems that can be simultaneously transmitting to avoid excessive noise addition. This maximum number is configured by the operator based on noise floor amplitude of the network.

In one arrangement, the collision characteristics are detected through analysis of one or more of the physical layer (PHY) metrics, including signal-to-noise ratio (SNR), power, low-density parity-check (LDPC) decoder status and/or check results, etc. More specifically, in one example, if the detected power is relatively high (e.g., high burst power), but the SNR is relatively low, the interference detection and avoidance module 140 may determine that a collision has occurred (e.g., multiple PHY metrics utilized to detect collisions). Additionally, the results of the LPDC decoding are compared to some criteria to determine the decoding integrity. In one example, if the code is below a threshold, the interference detection and avoidance module 140 determines that a collision has occurred. It is to be appreciated that other PHY metrics may be used to detect collision characteristics (and thus OBI) and that the above examples are provided merely for purposes of illustration.

In another arrangement, the collision characteristics are detected through analysis of one or more of the media access control (MAC) metrics. For example, the PHY module/layer (not shown in FIG. 2) of a CMTS 110 performs decoding and passes the code to the MAC module/layer (also not shown in FIG. 2). The MAC module can perform a header check sum (HCS) or cyclic redundancy check (CRC) on the received code. If one or more of these checks fail, the interference detection and avoidance module 140 may determine that a collision has occurred. Again, it is to be appreciated that other MAC metrics may be used to detect collision characteristics (and thus OBI) and that the above examples are provided merely for purposes of illustration.

The above description relates to the detection of OBI as a result of simultaneous transmissions of cable modems 120(1) and 120(2). In practice, the OBI detection in accordance with examples presented herein can be performed through a systematic/managed process that includes various combinations of the cable modems 120(1)-120(5). More specifically, the scheduler 135 can schedule different sets of the cable modems 120(1)-120(5) to transmit within a same frame (time slot). Table 1, below, illustrates example sets of cable modems that may transmit on the frequency channel 150. In Table 1, an "X" indicates that the corresponding cable modem transmits as part of the set. In accordance with the examples presented herein, the cable modems within a set transmit substantially simultaneously (e.g., within the same time slot) on the frequency channel 150, but the transmissions from the different sets occur sequentially and do not overlap (e.g., set 1 transmits, then set 2 transmits, and so on).

TABLE 1

| Set Number | Cable Modem 120(1) | Cable Modem 120(2) | Cable Modem 120(3) | Cable Modem 120(4) | Cable Modem 120(5) |
| --- | --- | --- | --- | --- | --- |
| 1 | X | X | | | |
| 2 | X | | X | | |
| 3 | X | | | X | X |
| 4 | | X | X | X | |
| 5 | | | | X | X |
| 6 | X | | | | X |
| 7 | | X | | X | |
| 8 | | | | | |
| 9 | | | X | X | |
| 10 | X | | X | | X |

It is to be appreciated that the sets of cable modems listed in Table 1 are merely illustrative and a number of other combinations are possible.

In accordance with the examples presented herein, collision/OBI detections are performed based on the different sets of simultaneous transmission to generate collision reports (e.g., indications of cable modems having upstream transmissions that collide). Using the collisions reports generated from a plurality of different sets of transmissions, the interference detection and avoidance module 140 may designate/identify "collision groups" that are described in greater detail below. In the context of DOCSIS deployments that utilize RFOG, a "collision group" refers to two or more cable modems that will cause OBI when the cable modems transmit upstream traffic within the same time slot/frame on the same frequency channel.

When cable modems are activated (turned on), the laser "chirps." This means that the laser wavelength changes slightly following activation. Therefore, if the activation of substantially simultaneously transmitting cable modems are slightly offset from one another (e.g., if the two lasers turn on at slightly different times), additional collisions may occur due to the wavelength changes. Therefore, in accordance with certain examples, the OBI detection process may include a further active search for collisions that would occur as a result of offset activation of the cable modems. More specifically, the sets of simultaneous cable modem transmissions described above may further include sets where the combinations of cable modems are activated at slightly different times so as to determine if any OBI resulting from the wavelength changes occurs (e.g., determine if the staggered activations would cause collisions). This information can be further used to designate the collisions groups described further below.

Figure 3:
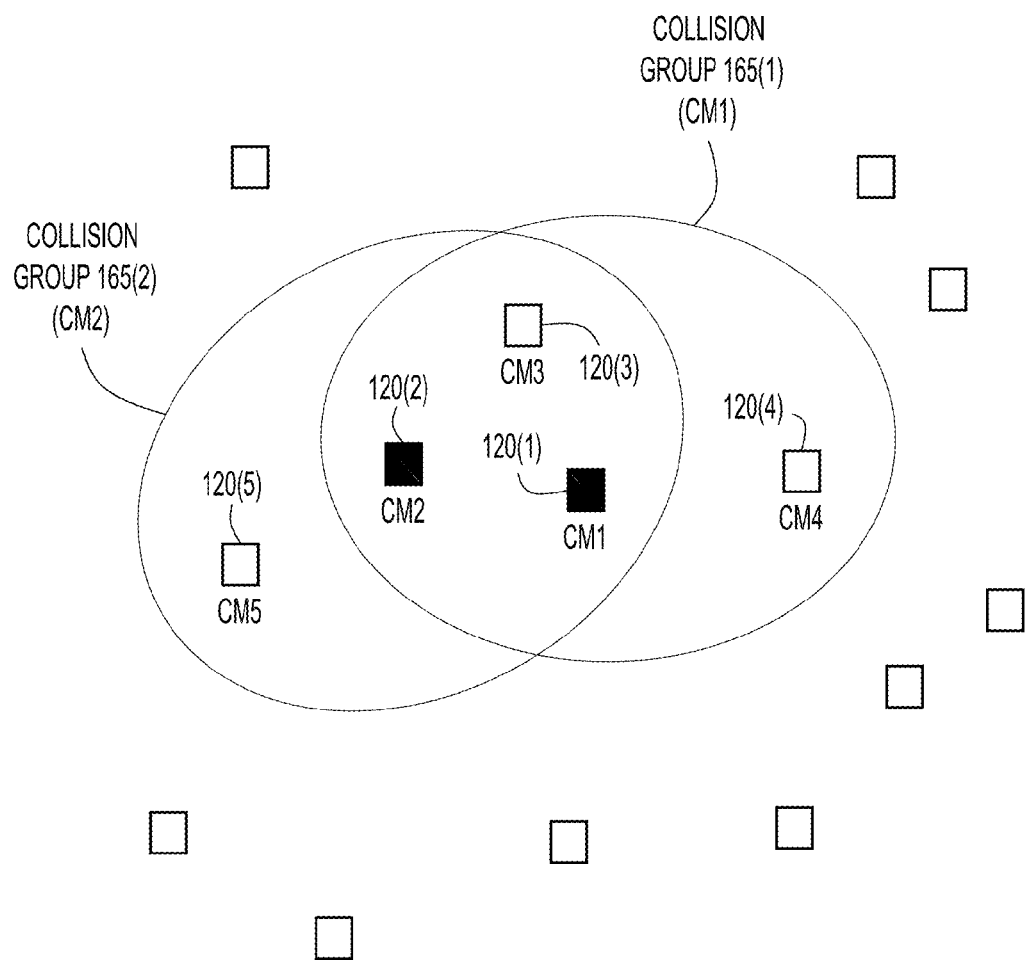
FIG. 3 is a schematic diagram illustrating collision groups in accordance with an example embodiment.

FIG. 3 schematically illustrates a collision group 165(1) that is designated for (e.g., associated with) cable modem 120(1) (CM1) and a collision group 165(2) that is designated for cable modem 120(2) (CM2). As shown, cable modems 120(2), 120(3), and 120(4) form part of collision group 165(1) with cable modem 120(1). That is, cable modems 120(2), 120(3), and 120(4) will cause OBI if they transmit substantially simultaneously (e.g., within the same frame as) with cable modem 120(1). The non-numbered boxes shown in FIG. 3 are generally representative of other cable modems within a system that are not part of either collision group 165(1) or 165(2).

Also as shown in FIG. 3, cable modems 120(1), 120(3), and 120(5) form part of collision group 165(2) with cable modem 120(2). That is, cable modems 120(1), 120(3), and 120(5) will cause OBI if they transmit substantially simultaneously (e.g., within the same frame as) with cable modem 120(2). The collision groups 165(1) and 165(2) are each designated based on the collision detection process described above.

The cable modem with which a collision group is associated is sometimes referred to herein as the primary cable modem for the collision group, while the other cable modems within the collision group are sometimes referred to herein as secondary cable modems. As such, in collision group 165(1), cable modem 120(1) is the primary cable modem and cable modems 120(2), 120(3), and 120(4) are the secondary cable modems. In collision group 165(2), cable modem 120(2) is the primary cable modem and cable modems 120(1), 120(3), and 120(5) are the secondary cable modems.

The collisions within a collision group are mutual between the primary cable modem and each of the secondary cable modems. That is, transmissions from the primary cable modem will cause OBI at each of the secondary cable modems, and vice versa. Due to the fact that there are mutual collisions between primary cable modem 120(1) and each of the secondary cable modems 120(2), 120(3), and 120(4), the primary cable modem 120(1) would be part of the collisions groups associated with each of the secondary cable modems 120(2), 120(3), and 120(4).

However, it is to be appreciated that the collision groups are not exclusive. That is, collision group 165(1) represents all of the collisions for only the primary cable modem 120(1) and does not necessarily represent all of the collisions for each of the secondary cable modems in collision group 165(1). For example, as shown with collision group 165(2), transmissions by cable modem 120(2) also collide with cable modem 120(5), which is not part of collision group 165(1). Therefore, there may be different collision groups for different cable modems and/or groups of cable modems. In summary, the collisions within a collision group are mutual, but the collision groups are not exclusive.

In accordance with certain examples, the OBI detection can be performed using normal upstream data traffic. In other examples, specialized scheduled traffic may be used for OBI detection purposes. For example, the scheduler 135 of CMTS 110 can schedule probing opportunities or use US Data Profile Testing Bursts in the same frame to a small group of cable modems to cause OBI detection. DOCSSIS 3.1 allows tests frames to be generated by cable modems and, in certain examples, these test frames may be used for the OBI detection.

In general, OBI is dynamic and may change due to, for example, the environment or other factors. For example, the wavelength of an optical transmitter in the Optical Network Unit (ONU) or Optical Network Termination (ONT) (i.e., the devices of an RFoG network that contain the lasers) may drift due to temperature change, aging, etc., resulting in changes to the OBI landscape. As such, the OBI detection may be performed occasionally, periodically, etc. to dynamically update the designated collision groups. In one particular example, the grouping processor 137 may collect the OBI collision information from all the data traffic associated with a first cable modem, such as cable modem 120(1), within a previous and/or current time period. Using the collected OBI collision information, the grouping processor 137 can dynamically update the collision group associated with the cable modem 120(1) to account for any OBI changes. The length and/or frequency of this detection time window can be adjusted dynamically based on the history of observed OBI, traffic type, traffic congestions, and/or other parameters.

In accordance with other examples, the frequency at which collision groups are updated may also change dynamically For example, if OBI is determined to be generally steady, the CMTS 110 may update the collision groups less frequently (e.g., perform less frequent collision detection). However, if the OBI experiences frequent changes, the grouping processor 137 may update the collision groups more frequently. In further examples, the OBI detection process described herein may only be activated after a triggering event (e.g., some initial OBI has been identified through one or more other mechanisms).

Cable modems 120(1)-120(5) may transmit different types of traffic. For example, the cable modems 120(1)-120(5) may, at different times, carry traffic that is sensitive to QoS variations, referred to herein as QoS sensitive traffic, or traffic that is not QoS sensitive, referred to herein as non-QoS sensitive traffic. QoS sensitive traffic may include, for example, voice traffic (e.g., voice services using UGS) or video traffic. Non-QoS sensitive may include, for example, Internet traffic. In certain examples presented herein, OBI detection can be prioritized or performed more frequently for cable modems that carry QoS sensitive upstream traffic.

As noted above, a second component of the interference detection and avoidance techniques is the use of the designated collision groups in a manner that enables upstream transmissions from multiple cable modems within a same time frame on the same frequency channel. In this OBI avoidance component, the scheduler 135 is configured to use the designated collision groups to schedule the upstream transmissions from the cable modems 120(1)-120(5). In general, when a cable modem, such as cable modem 120(1), is scheduled to transmit in a time frame, the scheduler 135 avoids also scheduling transmissions for any cable modems within the collision group associated with the cable modem (in this case collision group 165(1) and 165(2)) during that time frame. However, the transmissions from cable modems that are not within the same collision group as the cable modem may be scheduled within the same time frame.

As noted, certain types of traffic, such as voice traffic, are QoS sensitive. QoS sensitive traffic may be treated differently from non-QoS sensitive traffic. For example, the scheduler 135 may be configured to schedule QoS sensitive traffic in different time frames to reduce the possibility of collision (e.g., scheduler 135 may schedule voice services to cable modems with the same collision group in different time frames). The CMTS 110 may be configured to determine which traffic is QoS sensitive, or which cable modems transmit QoS sensitive traffic, and use this information to alter the scheduling process to prioritize or protect the QoS sensitive traffic.

As noted above, the interference detection and avoidance techniques are primarily described herein with reference to DOCSIS 3.1 supporting an RFOG deployment. However, the interference detection and avoidance techniques may be used in other arrangements such as, for example, ATDMA in RFoG deployment and/or a cable network that includes multiple OFDMA channels operating on different frequency ranges. Referring specifically to ATDMA in RFoG deployment, ATDMA channels do not allow multiple transmissions on the same channel. Instead, multiple channels operate at different frequencies and therefore different cable modems can transmit on different frequency channels at the same time. In certain cases, OBI may occur as a result of simultaneous transmissions on different frequency channels (e.g., the transmissions from the different cable modems may still collide even though they are on different frequency channels). In accordance with examples presented herein, the OBI detection can be extended to detect OBI between frequency channels (rather than within a channel as described above) that occur as a result of substantially simultaneous transmissions on the different channels.

In an example ATDMA in RFoG deployment, a CMTS may schedule sets of the cable modems to transmit traffic to the cable modem termination system within the same time slot, but on different channels. That is, the cable modems within each set transmit substantially simultaneously to the cable modem termination system (on different channels), but the transmissions from the different sets occur sequentially. Based on the sets of transmissions, collision characteristics resulting from substantially simultaneous transmissions from different combinations of the cable modems may be detected. Based on the detected collision characteristics, collision groups for each of a plurality of the cable modems may be designated/identified. After designation of the collision groups, the CMTS may schedule upstream transmissions by the plurality of cable modems such that cable modems within the same collision group do not transmit within a same time frame and such that two or more cable modems that are not within the same collision group transmit within a same time frame.

Figure 4:
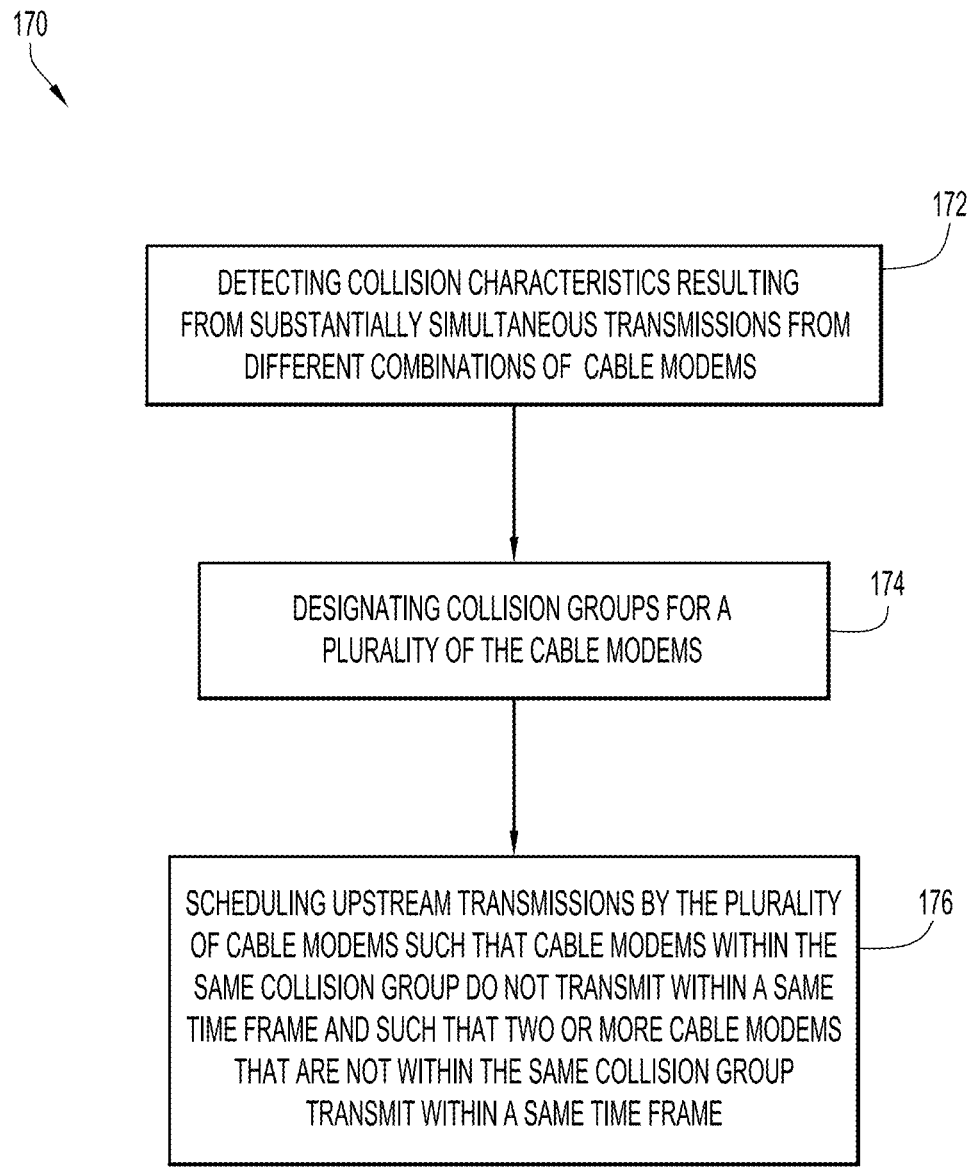
FIG. 4 is a high level flowchart of a method for interference detection and avoidance in accordance with an example embodiment.

FIG. 4 is a high level method 170 in accordance with the interference detection and avoidance techniques presented herein. Method 170, which is performed at a CMTS configured to receive upstream traffic from a plurality of cable modems, begins at 172 where the CMTS detects collision characteristics resulting from substantially simultaneous transmissions from different combinations of the cable modems. At 174, the CMTS designates collision groups for each of a plurality of the cable modems. At 176, the CMTS schedules upstream transmissions by the plurality of cable modems such that cable modems within the same collision group do not transmit within a same time frame and such that two or more cable modems that are not within the same collision group may transmit within a same time frame.

It is to be appreciated that the order of operations described with reference to FIG. 4 are merely illustrative and that, in other examples, certain operations may be performed in a different order. Additionally, other operations may be included in the method of FIG. 4. In an alternative example of FIG. 4, a plurality of sets of the cable modems are scheduled to transmit upstream traffic to the CMTS on a frequency channel. In such examples, the cable modems within a set transmit substantially simultaneously on the frequency channel, but the transmissions from the different sets occur sequentially on the frequency channel. The CMTS detects OBI resulting from the substantially simultaneous transmissions within one or more of the plurality of sets and identifies, based on the detected OBI, collision groups for each of a plurality of the cable modems. The CMTS schedules upstream transmissions by the plurality of cable modems such that cable modems within the same collision group do not transmit within a same time frame and such that two or more cable modems that are not within the same collision group transmit within a same time frame.

Figure 5:
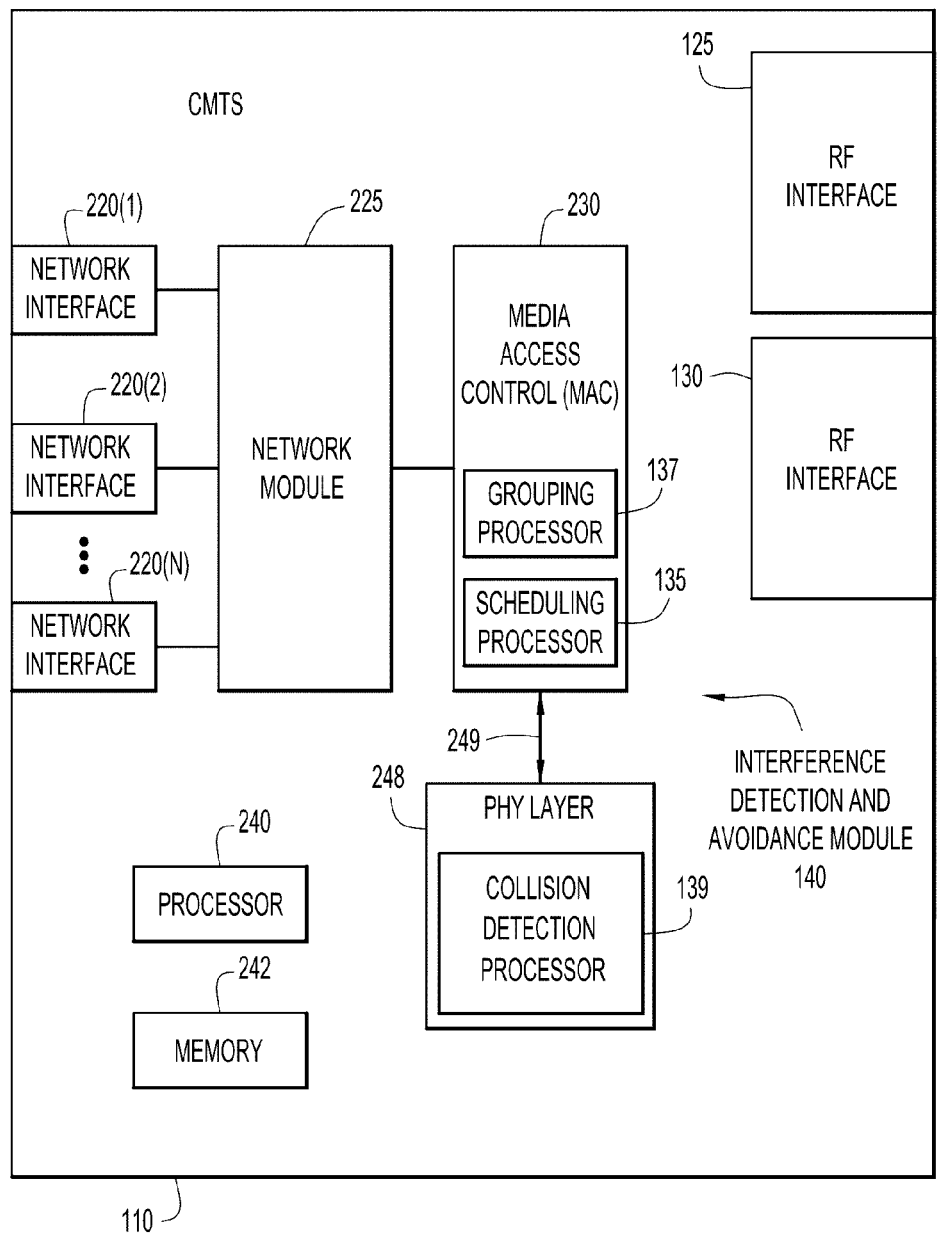
FIG. 5 is a block diagram of a cable modem termination system in accordance with an example embodiment.

FIG. 5 is a block diagram of one example configuration of CMTS 110 of FIGS. 1 and 2. As noted above, CMTS 110 includes one or more RF interfaces 125 (for downstream traffic transmission) and one or more RF interfaces 130 (for upstream traffic reception). CMTS 110 also comprises a plurality of network interfaces 220(1)-220(N), a network module 225, a media MAC module/layer or simply MAC 230, a processor 240, a memory 242, and a PHY layer or simply PHY 248. As shown, MAC 230 also includes the scheduler 135 that, as noted above, schedules upstream transmission from cable modems 120(1)-120(N) and the grouping processor 137. In the illustrative arrangement of FIG. 5, the PHY 248 includes the collision detection processor 139. However, it is to be appreciated that the collision detection processor 139 could alternatively be part of the MAC 230, or that a second collision detection processor 139 could be present in the MAC (e.g., to analyze MAC metrics).

Generally, network module 225 interfaces with MAC 230 to transmit information between the network interfaces 220(1)-220(N) and the MAC. Processor 240 is generally configured to manage bandwidth processing, and is in communication with both MAC 230 and network module 225 via, for example, a Peripheral Component Interconnect (PCI) bus (not shown in FIG. 5).

MAC 230 comprises hardware, software, or a combination thereof and operates to prepare packets for transmission to cable modems and to prepare packets received from the cable modems for use by network module 225. The packet preparation may include, for example, encryption, decryption, suppression, expansion, concatenation, fragmentation, multiplexing, demultiplexing, etc., depending on the desired configuration of the CMTS 110 and the related components. As shown, MAC 230 also includes the scheduler 135 that, as noted above, schedules upstream transmission from cable modems 120(1)-120(N).

Network interfaces 220(1)-220(N) may connect CMTS 110 with one or more computing network (e.g., a wide area network (WAN), a local area network (LAN), etc.). Network module 225 receives packets from MAC 230, and prepares the packets for forwarding to the network(s) via interfaces 220(1)-220(N). Similarly, network module 225 receives packets from the network(s) (via interfaces 220(1)-220(N)) and prepares these received packets for use by MAC 230. The packet preparation by network module 225 may include, for example, rate shaping, bandwidth limiting, priority queuing, etc., depending on the desired configuration of CMTS 110 and the related components.

As noted above with reference to FIG. 1, CMTS 110 includes interference detection and avoidance module 140 that is configured to execute interference detection and avoidance techniques. The operations of interference detection and avoidance module 140 may be implemented as part of PHY 248, namely collision detection processor 139, and as part of MAC 230, namely scheduler 135 and grouping processor 137. In certain examples, collision detection processor 139, scheduler 135, and grouping processor 137 are physical processing elements (e.g., digital logic gates in one or more application-specific integrated circuits (ASICS)) or a combination of physical processing elements and software.

Collision detection processor 139 is operable to perform the collision detection and to export the collision information from the PHY 248 to the MAC 230 for use by the grouping processor 137 and scheduler 135. In one specific example, an Upstream External PHY Interface (UEPI) 249 is defined for the PHY 248 to collectively report the OBI detection results to the MAC 230. That is, a "collision report" format is created for the PHY 248 to report collision information to the MAC 230.

FIG. 6 illustrates an example collision report 270 that may be generated by PHY 248 and provided to MAC 230. In this example, the collision report 270 uses the session identifier (SID) to report collision information. A value of "1" associated with a SID indicates that a collision has occurred. The SID is associated with a MAC address of the transmitting cable modem and there is a mapping table in the MAC 230. As such, the MAC 230 can determine which cable modem is associated with each SID and thus determine which cable modems caused the collision.

Merely for ease of illustration, PHY 248 and MAC 230 are shown in FIG. 5 as separate elements. It is also to be appreciated that FIG. 5 is merely illustrative and is not intended to limit to imply a specific structure for CMTS 110. It is also to be appreciated that other implementations for a CMTS are possible and may accordingly use the interference detection and avoidance techniques described herein.

The data within the collision report can be used to inform the operator of locations of potential hardware changes that would enhance the QoS of the overall network. Upstream lasers (e.g., RFoG optical network units (ONUs)) can be swapped to avoid predictable OBI tendencies and subsequent restrictions to simultaneous transmission. Analysis of occurrence and collision group size can be categorized and reported, allowing prioritization of potential network changes.

To again summarize, according to one example embodiment, a method is provided comprising: at a cable modem termination system configured to receive upstream traffic from a plurality of cable modems, detecting collision characteristics resulting from substantially simultaneous transmissions from different combinations of the cable modems; designating, based on the detected collision characteristics, collision groups for each of a plurality of the cable modems; and after designation of the collision groups, scheduling upstream transmissions by the plurality of cable modems such that cable modems within the same collision group do not transmit within a same time frame and such that two or more cable modems that are not within the same collision group transmit within a same time frame.

In apparatus form, an apparatus is provided comprising: one or more interfaces to receive, via telecommunications network, upstream traffic from cable modems; a collision detection processor that detects collision characteristics resulting from substantially simultaneous transmissions from different combinations of the cable modems; a grouping processor that identifies, based on the detected collision characteristics, collision groups for each of a plurality of the cable modems; and a scheduling processor that, after identification of the collision groups, schedules upstream transmissions by the plurality of cable modems such that cable modems within the same collision group do not transmit within a same time frame and such that two or more cable modems that are not within the same collision group transmit within a same time frame.

While the techniques illustrated and described herein are embodied in one or more specific examples, it is nevertheless not intended to be limited to the details shown, since various modifications and structural changes may be made therein without departing from the scope and range of equivalents of the claims.

What is claimed is:

1. A method comprising:
   at a cable modem termination system:
   detecting collision characteristics resulting from substantially simultaneous upstream transmissions from different combinations of cable modems;
   in response to detecting the collision characteristics, dynamically designating collision groups for each of a plurality of the cable modems, wherein a collision group comprises a primary cable modem and one or more secondary cable modems that, based on the collision characteristics, represent each of the cable modems that may interfere with the upstream transmissions of the primary cable modem; and
   scheduling upstream transmissions by the plurality of cable modems such that the primary cable modem and the one or more secondary cable modems within the same collision group do not transmit within a same time frame and such that two or more cable modems that are not within the same collision group may transmit within a same time frame.

2. The method of claim 1, wherein detecting collision characteristics comprises:
   scheduling sets of the cable modems to transmit traffic to the cable modem termination system, wherein the cable modems within each set transmit substantially simultaneously to the cable modem termination system, but the transmissions from the different sets occur sequentially; and
   analyzing one or more metrics associated with receipt of the transmissions from each set to detect collision characteristics.

3. The method of claim 2, wherein the cable modems within each set transmit within the same time frame and on the same frequency channel.

4. The method of claim 2, wherein the cable modems within each set transmit within the same time frame and on different frequency channels.

5. The method of claim 2, wherein analyzing one or more metrics associated with receipt of the transmissions from each set to detect collision characteristics comprises:
   analyzing physical layer (PHY) metrics associated with receipt of the transmissions from each set of cable modems to detect collision characteristics.

6. The method of claim 2, wherein analyzing one or more metrics associated with receipt of the transmissions from each set to detect collision characteristics comprises:
   analyzing media access control (MAC) layer metrics associated with receipt of the transmissions from each set of cable modems to detect collision characteristics.

7. The method of claim 1, further comprising:
   scheduling voice services to cable modems within the same collision group in different time frames.

8. A cable modem termination system apparatus comprising:
   one or more interfaces to receive, via telecommunications network, upstream traffic from cable modems;
   one or more processors that:
   detect collision characteristics resulting from substantially simultaneous upstream transmissions from different combinations of the cable modems;
   in response to detecting the collision characteristics, dynamically identify collision groups for each of a plurality of the cable modems, wherein a collision group comprises a primary cable modem and one or more secondary cable modems that, based on the collision characteristics, represent each of the cable modems that may interfere with the upstream transmissions of the primary cable modem; and
   schedule upstream transmissions by the plurality of cable modems such that the primary cable modem and the one or more secondary cable modems within the same collision group do not transmit within a same time frame and such that two or more cable modems that are not within the same collision group may transmit within a same time frame.

9. The apparatus of claim 8, wherein the one or more processors:

schedule sets of the cable modems to transmit traffic to the cable modem termination system, wherein the cable modems within each set transmit substantially simultaneously to the cable modem termination system, but the transmissions from the different sets occur sequentially; and analyze one or more metrics associated with receipt of the transmissions from each set of cable modems to detect collision characteristics.

10. The apparatus of claim 9, wherein to analyze one or more metrics associated with receipt of the transmissions from each set of cable modems to detect collision characteristics, the one or more processors:

analyze physical layer (PHY) metrics associated with receipt of the transmissions from each set to detect collision characteristics.

11. The apparatus of claim 9, wherein to analyze one or more metrics associated with receipt of the transmissions from each set of cable modems to detect collision characteristics, the one or more processors:

analyze media access control (MAC) layer metrics associated with receipt of the transmissions from each set to detect collision characteristics.

12. The apparatus of claim 8, wherein the one or more processors:

schedule voice services to cable modems within the same collision group in different time frames.

13. The apparatus of claim 8, wherein the one or more processors comprise a collision detection processor, a grouping processor, and a scheduling processor, and are each different processing entities.

14. The apparatus of claim 8, wherein one or more processors comprise a collision detection processor, a grouping processor, and a scheduling processor of which two or more are the same processing entities.

15. The apparatus of claim 8, further comprising a physical layer (PHY) processing unit and a media access control (MAC) processing unit, wherein the at least one of the one or more processors is a collision detection processor that is part of the PHY processing unit and wherein the PHY processing unit exports collision information to the MAC processing unit.

16. A method comprising:

at a cable modem termination system:

scheduling a plurality of sets of cable modems to transmit upstream traffic on a shared frequency channel, wherein the cable modems within each of the plurality of sets transmit substantially simultaneously on the frequency channel, but the transmissions from the different sets occur sequentially on the frequency channel;

detecting optical beat interference (OBI) resulting from the substantially simultaneous upstream transmissions within one or more of the plurality of sets;

in response to detecting the OBI resulting from the substantially simultaneous upstream transmissions, dynamically identifying collision groups for each of a plurality of the cable modems, wherein a collision group comprises a primary cable modem and one or more secondary cable modems that, based on the detected OBI, represent each of the cable modems that may interfere with the upstream transmissions of the primary cable modem; and scheduling upstream transmissions by the plurality of cable modems such that cable modems within the same collision group do not transmit within a same time frame and such that two or more cable modems that are not within the same collision group may transmit within a same time frame.

17. The method of claim 16, wherein detecting OBI comprises:

analyzing one or more metrics associated with receipt of the transmissions from each set of cable modems to detect collision characteristics.

18. The method of claim 17, wherein analyzing one or more metrics associated with receipt of the transmissions from each set to detect collision characteristics comprises:

analyzing physical layer (PHY) metrics associated with receipt of the transmissions from each set of cable modems to detect collision characteristics.

19. The method of claim 17, wherein analyzing one or more metrics associated with receipt of the transmissions from each set to detect collision characteristics comprises:

analyzing media access control (MAC) layer metrics associated with receipt of the transmissions from each set of cable modems to detect collision characteristics.

20. The method of claim 17, further comprising:

scheduling voice services to cable modems within the same collision group in different time frames.

* * * * *